US006842716B1

(12) United States Patent
Leleu (10) Patent No.: US 6,842,716 B1
(45) Date of Patent: Jan. 11, 2005

(54) METHOD AND APPARATUS FOR MEASURING THE PROPAGATION TIME OF A SIGNAL, IN PARTICULAR A ULTRASONIC SIGNAL

(75) Inventor: Christophe Leleu, Noya Odessa (BR)

(73) Assignee: Actaris S.A.S (FR)

( * ) Notice: Subject to any disclaimer, the term of this patent is extended or adjusted under 35 U.S.C. 154(b) by 0 days.

(21) Appl. No.: 09/914,512

(22) PCT Filed: Feb. 25, 2000

(86) PCT No.: PCT/FR00/00484

§ 371 (c)(1),
(2), (4) Date: Oct. 8, 2002

(87) PCT Pub. No.: WO00/52431

PCT Pub. Date: Sep. 8, 2000

(30) Foreign Application Priority Data

Mar. 3, 1999 (FR) ............................................. 99/02672

(51) Int. Cl.[7] .............................. G04F 1/00; G01R 27/26
(52) U.S. Cl. ................. 702/178; 73/861.27; 73/861.31; 324/617; 324/640; 702/79
(58) Field of Search ............................ 702/79, 89, 125, 702/176, 178, 187; 73/861, 27, 642, 31; 324/617, 640

(56) References Cited

U.S. PATENT DOCUMENTS 5,777,238 A * 7/1998 Fletcher-Haynes ....... 73/861.31

6,696,843 B1 * 2/2004 Beneteau et al. ........... 324/640

FOREIGN PATENT DOCUMENTS

DE 4017022 A1 * 7/1991

OTHER PUBLICATIONS

Translation of German Patent No: DE 4017022 A1 (Becker et al.).*

* cited by examiner

*Primary Examiner*—Michael Nghiem
*Assistant Examiner*—John H Le
(74) *Attorney, Agent, or Firm*—Straub & Pokotylo; Michael P. Straub (57) ABSTRACT

Propagation time $T_p$ of an ultrasound signal between two spaced-apart transducers constituting an emitter and a receiver is measured. The emitter transducer is subjected to an excitation signal of n successive pulses of period $T_e$ giving rise to an ultrasound signal being emitted towards the receiver transducer which receives the ultrasound signal generating and outputting a receive signal. A measurement of an intermediate propagation time $T_{int}$ is started when the emitter transducer begins to be excited. The receive signal is detected and the oscillations in the receive signal are counted. Measurement of the intermediate propagation time $T_{int}$ is stopped when an $i^{th}$ oscillation is detected. The propagation time $T_p$ is determined by taking the difference $T_{int} - i \times T_e$. Advantageously, measurement of $T_{int}$ is stopped for an $i^{th}$ oscillation of the receive signal that corresponds to the receive signal being at a maximum amplitude.

4 Claims, 6 Drawing Sheets

METHOD AND APPARATUS FOR MEASURING THE PROPAGATION TIME OF A SIGNAL, IN PARTICULAR A ULTRASONIC SIGNAL

The invention relates to a method and to apparatus for measuring the propagation time of signals, in particular ultrasound signals propagating between two transducers.

BACKGROUND OF THE INVENTION

Figure 1:
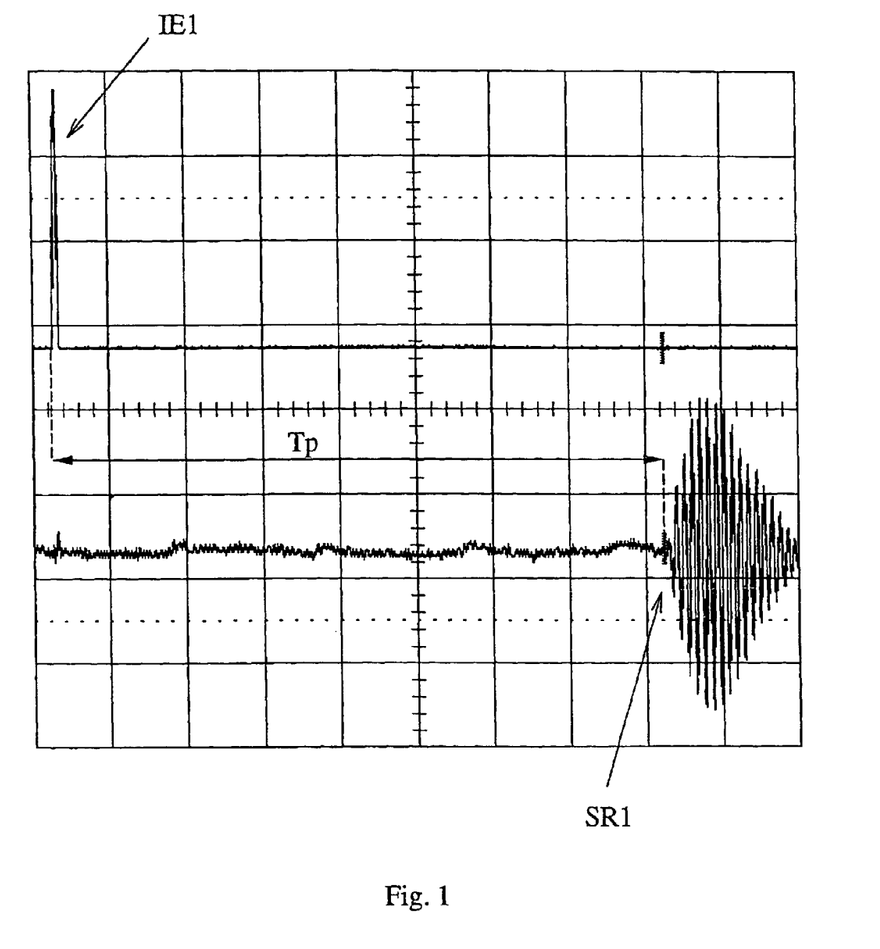
FIG. 1 shows the excitation signal of the emitter transducer and the signal output by the receiver transducer as a function of time for a prior art measurement method.
Figure 2:
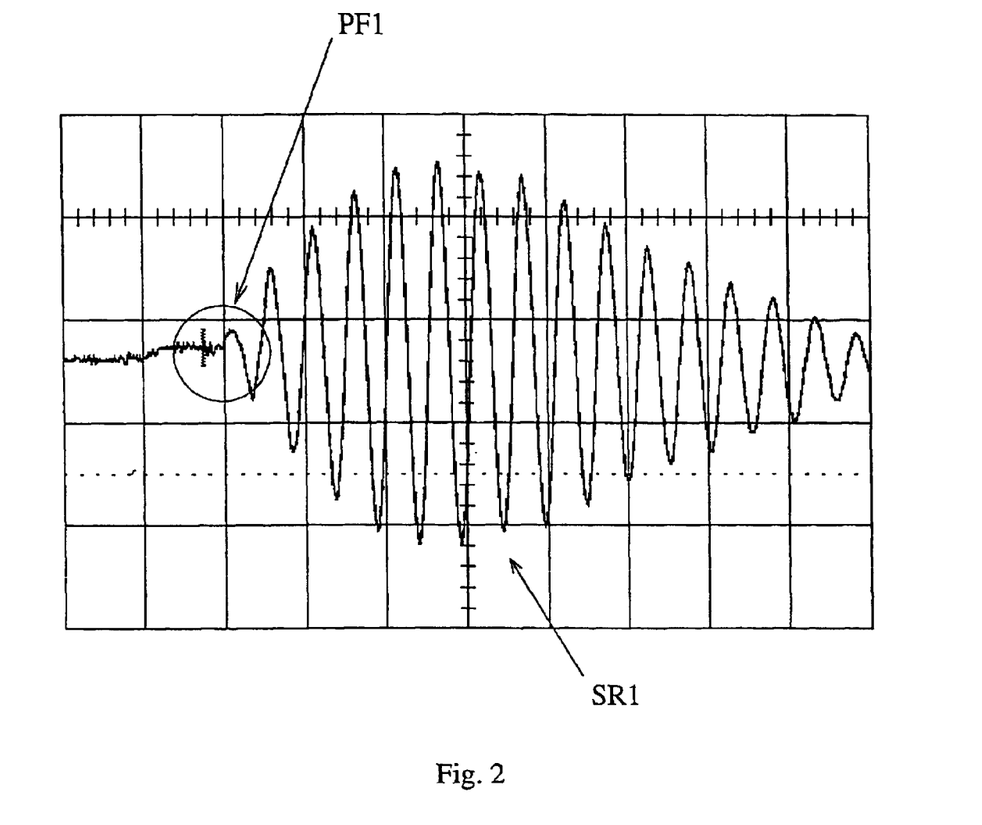
FIG. 2 shows the appearance of the receiver transducer response signal as a function of time when the emitter transducer is excited by a single pulse in a prior art measurement method.

A known method of measuring the time $t_p$ taken by a signal, e.g. An ultrasound signal, to propagate between two transducers consists in exciting the emitter transducer with an excitation pulse ie1. Such an excitation pulse is substantially in the form of a squarewave and the frequency spectrum includes the excitation frequency of the transducer. On being emitted by the emitter transducer, this pulse gives rise to an ultrasound wave in the medium between the two transducers. This wave will propagate towards the receiver transducer. FIG. 1 shows the excitation signal ie1 of the emitter transducer and the signal sr1 as output by the receiver transducer. The method consists in detecting the first oscillation of said wave on arrival at the receiver transducer. The propagation time $t_p$ is then the time between the instant at which the emitter transducer is subjected to the excitation pulse and the instant at which the first oscillation of the ultrasound wave is detected as arriving at the receiver transducer. That method is particularly difficult to implement and suffers from inaccuracy that gives rise to an erroneous measurement of propagation time. At the receiver transducer, the ultrasound wave gives rise to a response signal of very low amplitude. By way of example, in the context of an ultrasound flow meter used in heating networks, for a transducer having a resonant frequency close to 10 megahertz (mhz), the amplitude response of a received signal corresponds to a value lying in the range about 3 millivolts (mv) to 10 mv. FIG. 2 shows the appearance of the response signal from the receiver transducer sr1 when the emitter transducer is excited by a single pulse. The method consists in detecting the first oscillation of the ultrasound wave pf1 by detecting when a voltage threshold is crossed. That method requires very low voltage levels to be detected and very accurate control over the trigger threshold of the device for detecting the arrival of an oscillation in order to avoid introducing any delay in the propagation time measurement. That method can be made to be accurate by using an electronic threshold trigger component that is of high performance, but expensive. However, it becomes inaccurate when using an electronic threshold trigger component of ordinary type.

U.S. Pat. No. 5,123,286 discloses a method of determining the propagation time of an ultrasound wave between two transducers. The emitter transducer is excited by a squarewave pulse which gives rise to the appearance of a response signal that is typical for a damped oscillator whose peak amplitude increases over a certain number of periods before decreasing. That method proposes determining the propagation time between the instant at which the emitter transducer is excited and the instant at which the ultrasound signal is received by the receiver transducer. It consists in calculating an envelope for the response signal by determining firstly the amplitude of a group of periods and secondly the instants of the zero crossings of said periods. The point where said envelope intersects the baseline of the response signal is then calculated in order to determine the instant at which the response signal appears at the transducer. Finally, the propagation time is determined by calculating the difference between the excitation instant and said instant at which the signal appears.

Document DE 4 017 022 discloses electronic apparatus for improving the accuracy with which propagation time of an ultrasound signal between two transducers is measured. That apparatus proposes determining the instant corresponding to reception of the ultrasound signal in precise manner. The receive signal is applied to two comparators whose threshold voltages are different. A "cycle" signal and a "period" signal are generated. These signals trigger a cycle length counter and a period length counter. The output from the cycle length counter is connected to a memory for storing a binary signal corresponding to the receive signal. At the end of measuring cycle length, the content of the memory is analyzed while taking the period of the signal into consideration. The circuit takes account of the stored value to correct the length of the cycle and to determine propagation time.

An ultrasound flow meter described in document U.S. Pat. No. 5,777,238 measures the propagation time of the ultrasound signal by using at least one, adaptive or dynamic, reference windowing signal (which signal comprises a fixed portion and a variable portion) and a zero crossing detector or circuit. A zero crossing is determined for each period making up the receive signal and the propagation time is determined on the basis of a mean calculated from the times corresponding to said zero crossings.

Those methods are complex to implement, and require various measurements to be made and stored, and they also require numerous calculations to be performed.

OBJECTS AND SUMMARY OF THE INVENTION

The present invention thus provides a simplified measure of measuring the propagation time $T_p$ of an ultrasound signal between two spaced-apart transducers constituting an emitter and a receiver. The emitter transducer is subjected to an excitation signal comprising n successive pulses of period $T_e$ giving rise to an ultrasound wave being emitted. The ultrasound wave generates a receive signal at the output from the receiver transducer. The method comprises the following steps:

beginning a measurement of an intermediate propagation time when the emitter transducer begins to be excited;

detecting the receive signal at the output from the receiver transducer and counting the oscillations in said receive signal;

stopping measurement of the intermediate propagation time when an $i^{th}$ oscillation is detected; and determining the propagation time of the signal by taking the difference $T_{int} - i \times T_e$.

Advantageously, the excitation signal is constituted by n pulses, where $n \neq 1$, and the measurement of the intermediate propagation time $T_{int}$ is stopped on an $i^{th}$ oscillation of the receive signal, where $i \neq 1$.

In a first implementation, measurement of the intermediate propagation time $T_{int}$ is stopped for an $i^{th}$ oscillation of the receive signal that corresponds to the receive signal being at a maximum amplitude.

In a second implementation, the measurement of the intermediate propagation time $T_{int}$ is stopped for an $i^{th}$ oscillation of the receive signal, where $i=n$.

In a first particular implementation, the number of pulses n making up the excitation signal is preferably $n=4$ or $n=5$, and measurement of the intermediate propagation time $T_{int}$ is stopped for an $i^{th}$ oscillation of the receive signal, preferably where $i=4$ or $i=5$.

The response of the transducer to the train of n pulses corresponds to the transient response of an oscillator to periodic excitation. The peak amplitude of such a receive signal increases very quickly during the initial periods of the signal and then stabilizes on a constant amplitude. A first advantage is that the amplitude of the $i^{th}$ oscillation is greater when responding to a train of n pulses (where n>1) than when responding to a single excitation pulse. Another advantage of measuring propagation time on an $i^{th}$ oscillation selected in appropriate manner is that it becomes possible to measure propagation time using a signal of amplitude that is much greater than that of the first oscillation of the receive signal. Thus, firstly the trigger threshold can be small relative to the peak amplitude of the receive signal, which means that the delay introduced by the time taken by the receive signal to reach the trigger threshold is much smaller for the $i^{th}$ oscillation than for the first oscillation, and secondly this method makes it possible to use a standard trigger threshold comparator without any need to monitor its trigger threshold accurately, while still considerably improving the accuracy with which propagation time is measured.

The present invention also provides apparatus for measuring the propagation time $T_p$ of an ultrasound signal, the apparatus comprising:

means for forming an excitation signal;

an emitter transducer 1, 2 connected to said means for forming an excitation signal;

a receiver transducer to transform the ultrasound signal into a receive signal; and comparator means connected to said receiver transducer to compare the amplitude of the receive signal with a trigger threshold voltage and to generate a signal representative of oscillations of said receive signal;

said apparatus further comprising:

means for measuring a fixed time $T_0$ connected to said means for forming an excitation signal in order to measure a fixed time $T_0$ from the instant at which the emitter transducer is excited;

means for determining an $i^{th}$ oscillation, which means are connected to said comparator means, to count the number of oscillations in the receive signal and to detect the $i^{th}$ oscillation; and means for measuring a variable time $T_{IEX}$ between the end of measuring $T_0$ and detecting the $i^{th}$ oscillation.

BRIEF DESCRIPTION OF THE DRAWINGS

Other characteristics and advantages appear from the following description given by way of non-limiting example and made with reference to the accompanying drawings, in which.

MORE DETAILED DESCRIPTION

Figure 3:
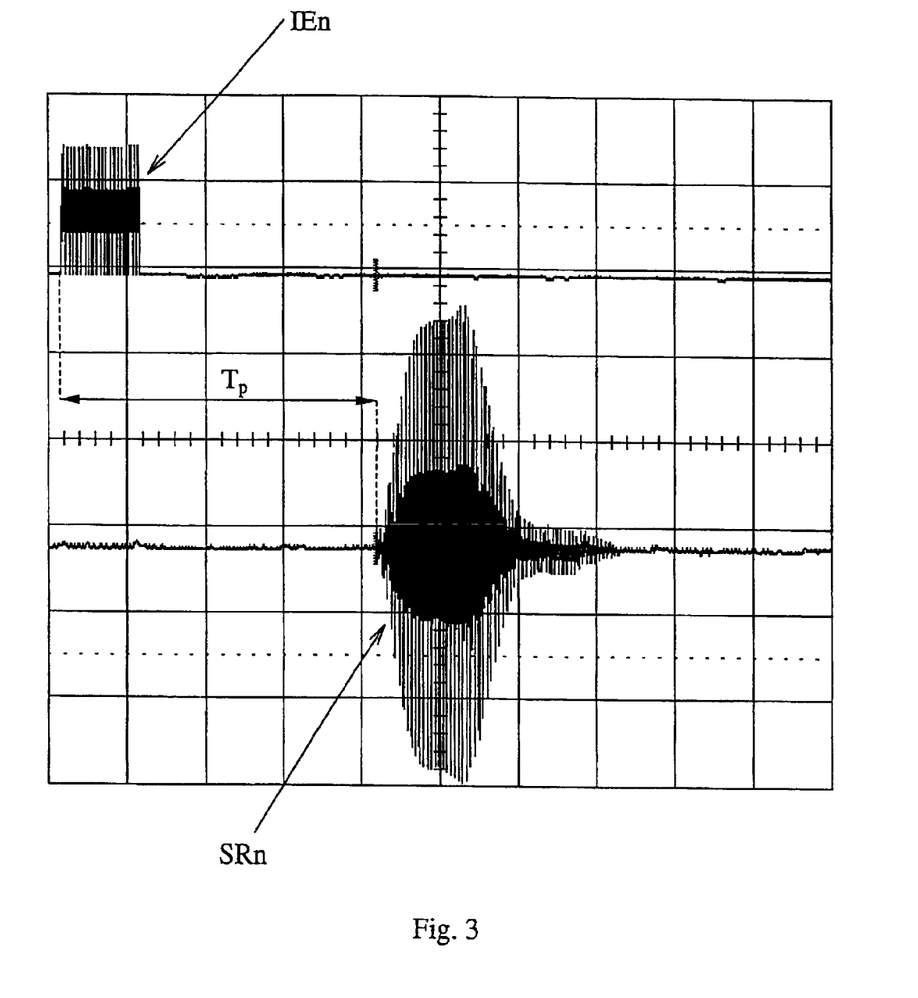
FIG. 3 shows the excitation signal of the emitter transducer and the signal output by the receiver transducer as a function of time in the measurement method of the invention.

FIG. 3 shows the excitation signal IEn for exciting the emitter transducer and also the receive signal SRn as measured at the output from the receiver transducer. The propagation time $T_p$ that is to be measured is the time that elapses between the instant when the excitation signal is sent to the transducer and the instant when the resulting ultrasound signal reaches the receiver transducer.

The excitation signal IEn comprises a succession of n pulses, e.g. having a duty ratio of 0.5. The number of pulses n making up the excitation signal is such that n≠1. The frequency spectrum of each pulse includes at least an excitation frequency $f_e$ close to the resonant frequency of the transducer, e.g. 1 MHz. Thus, since the transducer is comparable to an oscillator, when it is subjected to a succession of pulses, each pulse being substantially in the form of a squarewave, it will be put into conditions of sustained periodic oscillation, for a length of time that is associated with the number of pulses making up the excitation signal. The ultrasound signal emitted by the emitter transducer towards the receiver transducer through the medium between the two transducers results from the excitation signal whose characteristics are described above. At the receiver transducer, this wave gives rise to the receive signal SRn. The ultrasound signal and the resulting electrical receive signal as output by the receiver transducer typically have the form of a packet of waves, i.e. of an oscillation of amplitude that increases, reaches a maximum, and subsequently decreases. Since amplitude decreases when the emitter transducer is no longer subjected to the excitation signal, the signal then behaves as a damped oscillation.

Figure 4:
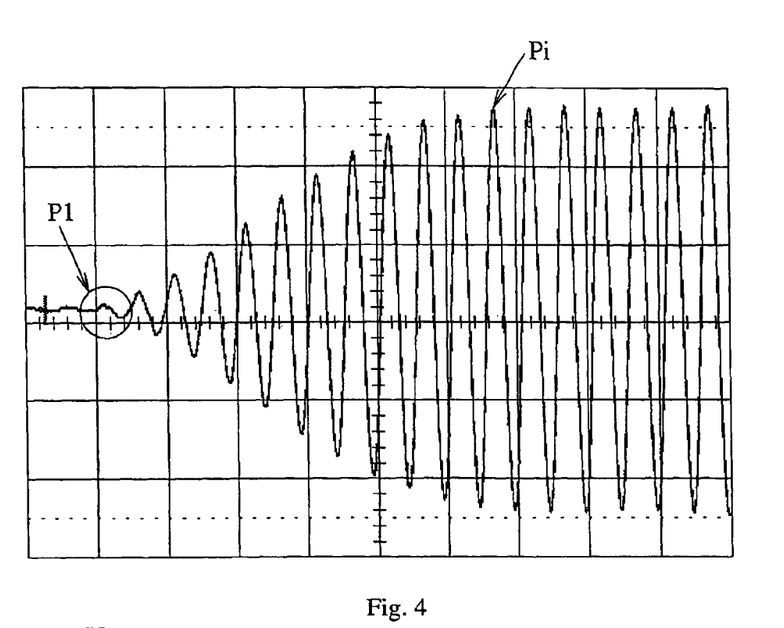
FIG. 4 shows the appearance of the receiver transducer receive signal as a function of time when the emitter transducer is excited by a train of pulses in a measurement method of the invention.
Figure 5:
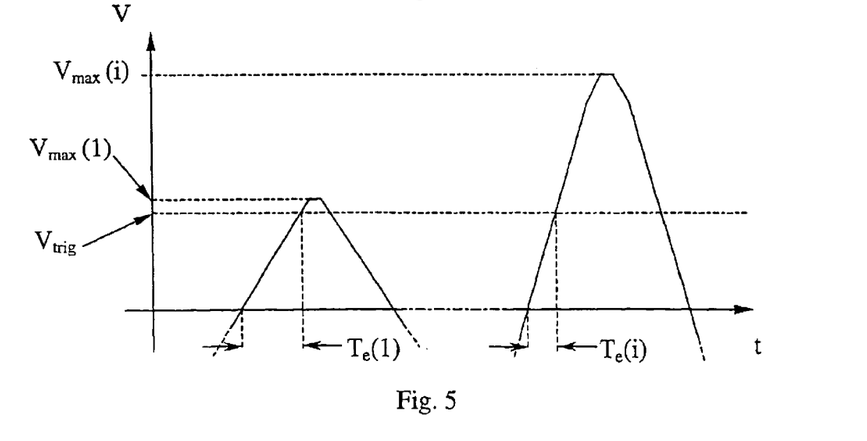
FIG. 5 shows the amplitude of the receiver transducer receive signal for the first oscillation and for the $i^{th}$ oscillation.

FIG. 4 shows a portion of the receive signal measured at the output from the receiver transducer. FIG. 5 shows the amplitude of this signal for its first oscillation and for its $i^{th}$ oscillation.

The first oscillation P1 of the receive signal has an amplitude $V_{max}(1)$ that is low, but nevertheless greater than the trigger threshold $V_{trig}$, enabling it to be detected by a suitable electronic circuit. However, the $i^{th}$ oscillation Pi of the receive signal has an amplitude $V_{max}(i)$ which is much greater than the trigger threshold $Vt_{rig}$. It is therefore clear that the error in measuring time that corresponds to the precise instant at which the threshold voltage crossing is detected decreases with increasing amplitude. Consequently, the error in the $i^{th}$ oscillation Pi is much smaller than the error on the first oscillation P1. In order to minimize error in measuring propagation time, it is therefore preferable to measure an intermediate propagation time on the $i^{th}$ oscillation, and then correct the measurement by subtracting the time that elapses between the first oscillation and the $i^{th}$ oscillation being detected.

Advantageously, measurement of the intermediate propagation time $T_{int}$ is stopped for an $i^{th}$ oscillation of the receive signal, where i≠1. In a particularly advantageous implementation, measurement of the intermediate propagation time $T_{int}$ is stopped for an $i^{th}$ oscillation of the receive signal that corresponds to the receive signal being at a maximum amplitude.

In another implementation, measurement of the intermediate propagation time $T_{int}$ is stopped for an $i^{th}$ oscillation of the receive signal, where i=n.

FIGS. 6a to 6d are described below in association with FIG. 7. FIG. 7 gives timing diagrams for the signals involved in the electronic circuits of FIGS. 6a to 6d. In all of FIGS. 6a to 6d, a battery (not shown) supplies the power required for causing the various electronic components to operate via suitable cabling known to the person skilled in the art.

Such apparatus finds an application in particular in the field of ultrasound flow metering. The two transducers 1, 2 are disposed in a fluid flow, with the transducer 1 acting alternately as an emitter and then as a receiver, with the transducer 2 being in the opposite state to the transducer 1. The time taken by ultrasound waves to propagate through the flowing fluid between the two transducers 1, 2 in the upstream direction T1 and in the downstream direction T2 makes it possible to calculate the fluid flow rate Q as a function of a defined term K associated with the geometry of the flow meter:

$$Q \approx \frac{4 \times K \times |T2 - T1|}{(T1 + T2)^2}$$

Figure 6A:
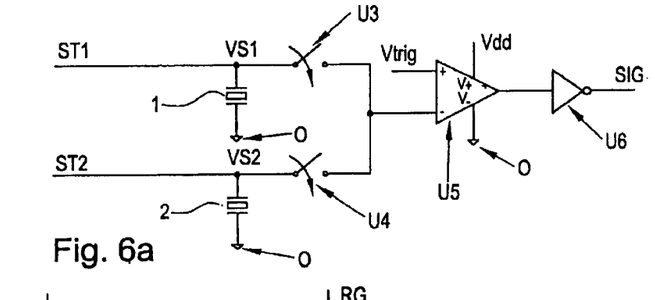
FIGS. 6a to 6d are diagrams of various electronic circuits enabling the method of the invention to be implemented.
Figure 7:
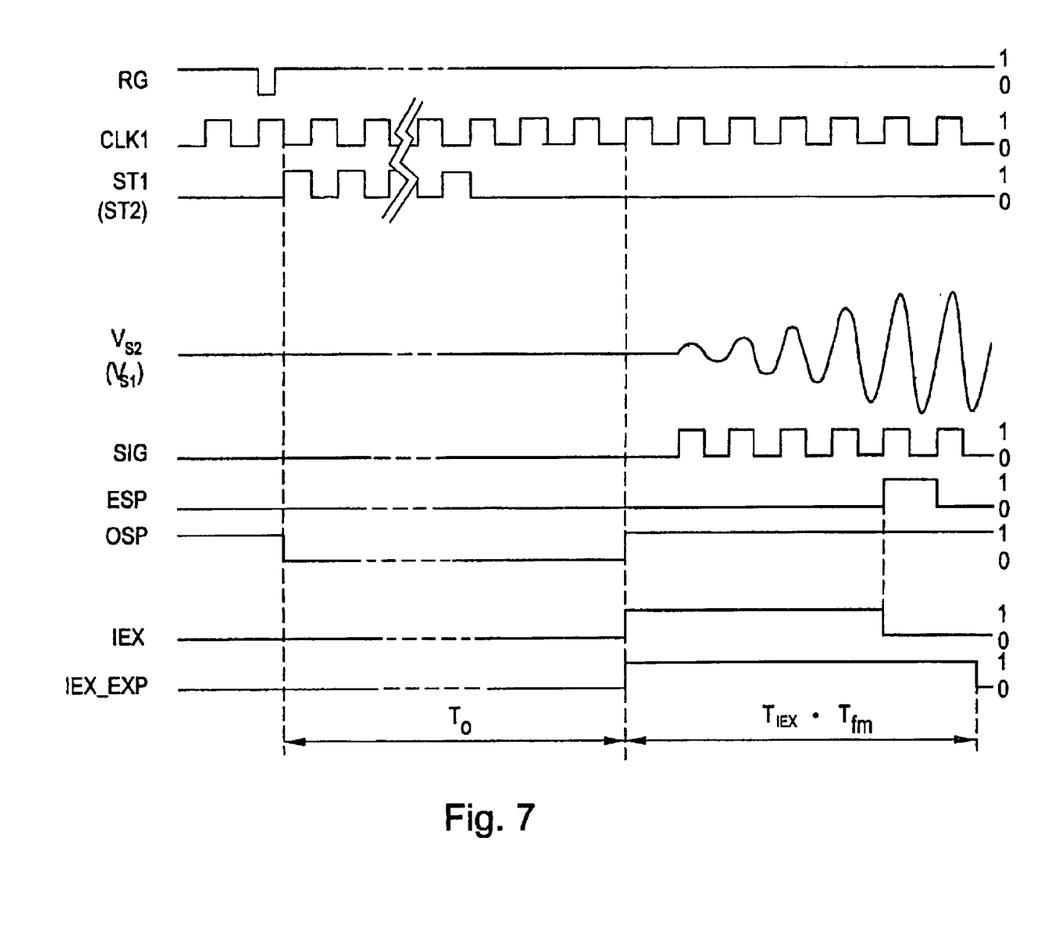
FIG. 7 shows timing diagrams for various signals associated with the electronic circuits of FIGS. 6a to 6d.

FIG. 6a is a diagrammatic view of the circuit which controls emission and reception of ultrasound waves by the transducers 1, 2. During emission stages, a microcontroller (not shown) causes an emission signal ST1, ST2 (see FIG. 7) to be applied to the corresponding transducer 1, 2. The emission signal ST1, ST2 comprises a train of n pulses at a frequency fe, e.g. 1 MHz. The pulse train is synchronous with a clock signal CLK1.

In FIG. 6a, the transducers 1, 2 are of the type comprising a piece of piezoelectric material having two metallized surfaces, one of which is connected to ground (0) and the other to a respective switch U3, U4. When the transducer 1 is subjected to an excitation signal ST1 and emits an ultrasound signal towards the transducer 2, the switch U3 is open while the switch U4 connected to the transducer 2 in receive mode is closed. The configuration of the switches is inverted when the transducer 2 is subjected to the excitation signal ST2 and the transducer 1 is in receive mode. The switches U3, U4 are controlled by the microcontroller (not shown) in conventional manner. The output voltage VS1, VS2 from the respective transducer 1, 2 is applied to the inverting input of a comparator U5. The comparator U5 is powered by the voltage Vdd via a V+ input. A V− input of the comparator U5 is connected to ground 0. Its non-inverting input is connected to a reference voltage referred to as the trigger voltage Vtrig. The output from the comparator is connected to an inverter U6. Thus, the receive signal SIG is available at the output from the comparator unit U5, U6, which is adjusted for a detection threshold Vtrig. When the voltage threshold Vtrig is exceeded, a low or "0" state appears at the output from the comparator U5, and when the signal lies below the voltage threshold it delivers a high or "1" state. The signal SIG (see FIG. 7) supplied by the circuit of FIG. 6a is thus representative of the receive signal supplied by the emitter transducer, each pulse in the signal SIG corresponding to a positive half cycle of an oscillation in the receive signal.

Figure 6B:
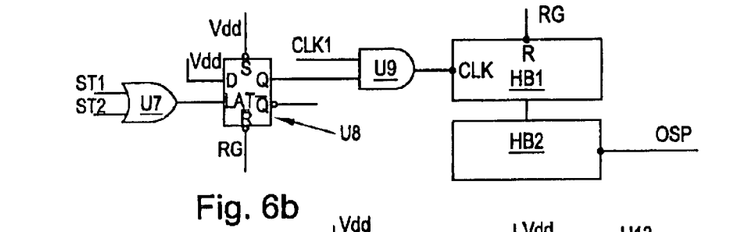
Figure 6C:
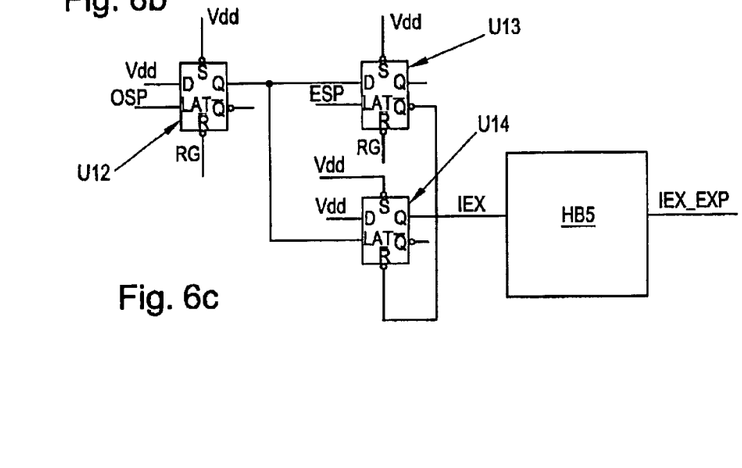
Figure 6D:
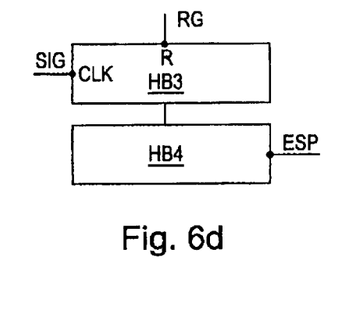

FIGS. 6b, 6c, and 6d are diagrams of circuits for measuring propagation time. Propagation time is determined by adding two time contributions. Firstly, a first circuit shown in FIGS. 6b and 6d serves to count a fixed length of time $T_0$, and then a second circuit as shown in FIG. 6c serves to measure the time that remains between $T_0$ and the instant corresponding to the corresponding signal being detected on its $i^{th}$ oscillation. To determine this remaining time, which time is variable, it must be possible to measure a short duration, which cannot be done by using conventional means such as a clock and a high frequency counter, for example. This problem can be overcome by using a time expander circuit. The principle on which a time expander circuit operates is already described in patent FR 2 750 495. The time expander circuit HB5 multiplies the duration of a pulse by a time multiplication factor specific to the time expander circuit. The expanded time interval output from the circuit HB5 can be measured in conventional manner, thus making it possible to deduce the duration of the pulse by dividing the duration of the expanded time interval by the multiplication factor.

In FIG. 6b, a logic OR gate U7 has one of its two inputs receiving the signal ST1 and its other input receiving the signal ST2, and it has its output connected to the input LAT of a D-type bistable U8. Thus, when a signal ST1 or ST2 is present on one of the inputs of the gate U7, that signal is applied to the input LAT. The two inputs S and D of the bistable U8 are at the potential Vdd, i.e. in a high state, while the input $\overline{R}$ is subjected to an initialization signal RG. The output $\overline{Q}$ of the bistable U8 is floating. The other output Q from the bistable U8 is connected to an AND gate U9 whose other input is subjected to the clock signal CLK1. Thus, after the bistable U8 has been initialized, as soon as a signal ST1 or ST2 is present on the input LAT, the output Q of the bistable switches to the high state. The signal output by the logic gate U9 then becomes the clock signal CLK1. The output from the logic gate U9 is connected to the CLK input of counter HB1 which possesses an input R subjected to the initialization signal RG. The counter HB1 thus counts the number of periods reaching its CLK input after initialization by RG. The output from the counter HB1 is connected to the input of a decoder HB2, which in turn outputs a signal OSP representative of the fixed time interval $T_0$. This duration $T_0$ corresponds to the duration during which the signal OSP is in a low state.

This circuit therefore acts to measure a fixed length of time $T_0$ starting from the first change in state caused by a signal ST1 or ST2 reaching one or other of the inputs of the gate U7.

Once the first duration $T_0$ has been measured, the second circuit shown in FIG. 6c determines the remaining duration between the end of the count corresponding to $T_0$ and the $i^{th}$ oscillation in the receive signal SIG being detected.

Initially, it is necessary to detect the $i^{th}$ oscillation. This task is performed by the circuit shown in FIG. 6d. This circuit has a counter HB3 having an R input and a CLK input, which inputs are subjected to the initialization signal RG and to the receive signal SIG, respectively. After initialization, on arrival of the signal SIG, the counter counts the number of pulses in the receive signal SIG. The inputs of the decoder HB4 is connected to the output of the counter HB3 such that when the counter reaches the $i^{th}$ pulse, the detection signal ESP output from the decoder HB4 passes from the low state to the high state during one period of the receive signal SIG (see FIG. 7).

The circuit of FIG. 6c serves to determine the very short duration that elapses between the end of $T_0$ count and detection of the $i^{th}$ oscillation, and it does this by means of the time expander circuit HB5. A first D-type bistable U12 has its D and S inputs connected to the potential Vdd and has its $\overline{R}$ input subjected to the initialization signal RG, while its input LAT receives the signal OSP which marks the end of the time during which $T_0$ is being measured by switching to the high state (see FIG. 6b and FIG. 7). The output $\overline{Q}$ from the bistable U12 is floating. The output Q passes to a high state when the signal OSP passes from the low state to the high state. The output Q of the bistable U12 is connected to the input D of the bistable U13 and to the input LAT of the bistable U14. The inputs S, LAT, and $\overline{R}$ of the bistable U13 are subjected to the potential Vdd, to the detection signal ESP, and to the initialization signal RG, respectively. The output Q of the bistable U13 is floating while the output $\overline{Q}$ is connected to the input $\overline{R}$ of the bistable U14. Thus, once the signal OSP passes from a low state to a high state after $T_0$ has been measured, and the detection signal ESP passes to a high state on detecting the $i^{th}$ oscillation, the output $\overline{Q}$ passes from a high state to a low state, forcing the output Q of the bistable U14 to zero (signal IEX). The inputs S and D of the bistable U14 are at the potential Vdd. The output $\overline{Q}$ of the bistable U14 is floating. The output Q of the bistable U14 supplies the signal IEX which is in the high state when the signal OSP passes to the high state and for so long as the detection signal ESP has not switched from the low state to the high state. The signal IEX is thus a pulse whose high state begins at the end of measuring the duration $T_0$ and ends when the $i^{th}$ oscillation is detected. The time expander HB5 processes the signal IEX so that the duration $T_{IEX}$ during which the pulse corresponding to the signal IEX is in the high state is multiplied by a factor $T_{fm}$. The resulting signal at the output from the expander HB5 is the signal IEX_EXP.

The two signals OSP and IEX_EXP are processed by a microcontroller (not shown) which determines the intermediate propagation time, e.g. for an ultrasound wave propagating between the transducers 1 and 2:

$$T_{int} = T_0 + \frac{T_{TEX}}{T_{fm}}$$

Thereafter, the microcontroller determines the propagation time $T_p$ as a function of the selected number i and of the period of the excitation signal ST1 of the transducer:

$$T_p = T_{int} - i \times T_e$$

All of the above-described electronic circuits can be integrated in an application specific integrated circuit (ASIC). The number n of pulses making up the excitation signal and the number i determining which oscillation of the receive signal is used for measuring propagation time can be programmed in the ASIC or in the software managing the ASIC and the data it provides.

Advantageously, measurement of the intermediate propagation time $T_{int}$ is stopped for an $i^{th}$ oscillation of the receive signal that corresponds to the receive signal being at a maximum amplitude.

By way of example, and in the field of an ultrasound flow meter using meters having ultrasound transducers with a resonant frequency close to 1 MHz, the ASIC and the software are programmed in such a manner that the number of pulses n making up the excitation signal is preferably n=4 or n=5, and measurement of the intermediate propagation time $T_{int}$ is stopped for an $i^{th}$ oscillation of the receive signal such that, preferably i=4 or i=5. Furthermore, the method and the apparatus of the invention when applied to ultrasound flow measurement make it possible to improve the accuracy of measurement significantly, enabling an error of less than 0.5% to be achieved on propagation time measurement, while nevertheless using an ordinary threshold trigger component of low cost and that consumes little energy.

Although the invention is described above with reference to ultrasound waves, it is clear that it is not limited to this type of wave, and the person skilled in the art can transpose the method to any other type of wave, for example electrical or electromagnetic waves. The same applies to the apparatus for measuring propagation time.

What is claimed is:

1. Apparatus for measuring the propagation time ($T_p$) of an ultrasound signal, the apparatus comprising:

means for forming an excitation signal;

an emitter transducer (1, 2) connected to said means for forming an excitation signal;

a receiver transducer (2, 1) to transform the ultrasound signal into a receive signal; and comparator means connected to said receiver transducer to compare the amplitude of the receive signal with a trigger threshold voltage and to generate a signal representative of oscillations of said receive signal;

the apparatus being characterized in that it further comprises:

means for measuring a fixed time (HB1, HB2) connected to said means for forming an excitation signal in order to measure a fixed time ($T_0$) from the instant at which the emitter transducer is excited;

means for determining an $i^{th}$ oscillation (HB3, HB4), which means are connected to said comparator means, to count the number of oscillations in the receive signal and to detect the $i^{th}$ oscillation; and means (HB5) for measuring a variable time ($T_{IEX}$) between the end of measuring the fixed time ($T_0$) and detecting the $i^{th}$ oscillation.

2. Apparatus for measuring the propagating time ($T_p$) of an ultrasound signal according to claim 1, characterized in that the means for measuring a fixed time ($T_0$) comprise a counter (HB1) and a decoder (HB2).

3. Apparatus for measuring the propagating time ($T_p$) of an ultrasound sound according to claim 1 or claim 2, characterized in that the means for determining the $i^{th}$ oscillation comprise a counter (HB3) and a decoder (HB4).

4. A device for measuring the propagation time $T_p$ of an ultrasound signal according to any one of claims 1 to 2, characterized in that the means for measuring the variable time ($T_{IEX}$) comprise a time expander circuit (HB5).

* * * * *